United States Patent
Seo et al.

(10) Patent No.: US 9,369,999 B2
(45) Date of Patent: Jun. 14, 2016

(54) METHOD FOR TRANSMITTING/RECEIVING SIGNAL BETWEEN BASE STATION AND RELAY NODE IN WIRELESS COMMUNICATION SYSTEM AND DEVICE THEREFOR

(75) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 342 days.

(21) Appl. No.: 14/007,573

(22) PCT Filed: Apr. 18, 2012

(86) PCT No.: PCT/KR2012/002942
§ 371 (c)(1),
(2), (4) Date: Sep. 25, 2013

(87) PCT Pub. No.: WO2012/150774
PCT Pub. Date: Nov. 8, 2012

(65) Prior Publication Data
US 2014/0010190 A1    Jan. 9, 2014

Related U.S. Application Data

(60) Provisional application No. 61/482,225, filed on May 4, 2011, provisional application No. 61/485,117, filed on May 11, 2011, provisional application No. 61/485,648, filed on May 13, 2011, provisional application No. 61/487,255, filed on May 17, 2011.

(51) Int. Cl.
*H04J 4/00* (2006.01)
*H04B 7/216* (2006.01)
(Continued)

(52) U.S. Cl.
CPC ........... *H04W 72/042* (2013.01); *H04L 5/0032* (2013.01); *H04L 5/0048* (2013.01); *H04L 5/0053* (2013.01); *H04L 5/0026* (2013.01); *H04L 5/0055* (2013.01)

(58) Field of Classification Search
None
See application file for complete search history.

(56) References Cited

U.S. PATENT DOCUMENTS

2004/0190482 A1    9/2004  Baum et al.
2010/0103901 A1    4/2010  Miki et al.
(Continued)

FOREIGN PATENT DOCUMENTS

JP    2011-19269 A     1/2011
KR    10-0750527 B1    8/2007
(Continued)

OTHER PUBLICATIONS

WO2010101366A2(machine translation).*
(Continued)

*Primary Examiner* — Edan Orgad
*Assistant Examiner* — Sithu Ko
(74) *Attorney, Agent, or Firm* — Birch, Stewart, Kolasch & Birch, LLP

(57) ABSTRACT

Disclosed in the present invention is a method for a transmitting end to transmit a downlink signal to a receiving end in a wireless communication system. More particularly, the present invention comprises the steps of mapping a downlink control channel to a specific resource block pair among one or more resource block pairs; mapping a downlink data channel to a $2^{nd}$ slot of the specific resource block pair and another resource block pairs of the one or more resource block pairs; and transmitting the downlink control channel and the downlink data channel to the receiving end, wherein a number of a spatial resource for the downlink control channel mapped to the $2^{nd}$ slot of the specific resource block pair is limited to be equal to or smaller than a predetermined number.

20 Claims, 17 Drawing Sheets

(51) Int. Cl.
*H04W 72/04* (2009.01)
*H04L 5/00* (2006.01)

(56) References Cited

U.S. PATENT DOCUMENTS

| | | | | |
|---|---|---|---|---|
| 2011/0019764 A1* | 1/2011 | Chung | ............... | H04L 1/06 375/295 |
| 2011/0085506 A1* | 4/2011 | Lee | ............... | H04L 5/0023 370/329 |
| 2011/0194536 A1* | 8/2011 | Kim | ............... | H04L 5/0023 370/335 |
| 2013/0265934 A1* | 10/2013 | Zeng | ............... | H04L 5/0023 370/315 |
| 2014/0313970 A1 | 10/2014 | Seo et al. | | |

FOREIGN PATENT DOCUMENTS

| | | | | |
|---|---|---|---|---|
| KR | WO 2010101366 A2 * | 9/2010 | ............ | H04B 7/155 |
| WO | WO 2010/085909 A1 | 8/2010 | | |
| WO | WO 2010/087666 A2 | 8/2010 | | |
| WO | WO 2011/049401 A2 | 4/2011 | | |

OTHER PUBLICATIONS

LG Electronics, "Remaining Details in Non-interleaving R-PDCCH Transmission", 3GPP TSG RAN WG1 Meeting #63, R1-106135, Jacksonville, USA, Retrieved on Nov. 9, 2010, pp. 1-7. XP050598860.

LG-Nortel, "R-PDCCH Multiplexing for LTE-A relay node", 3GPP TSG RAN WG1 #61, R1-103145, Montreal, Canada, Retrieved on May 4, 2010, 6 pages. XP050420213.

* cited by examiner

FIG. 2
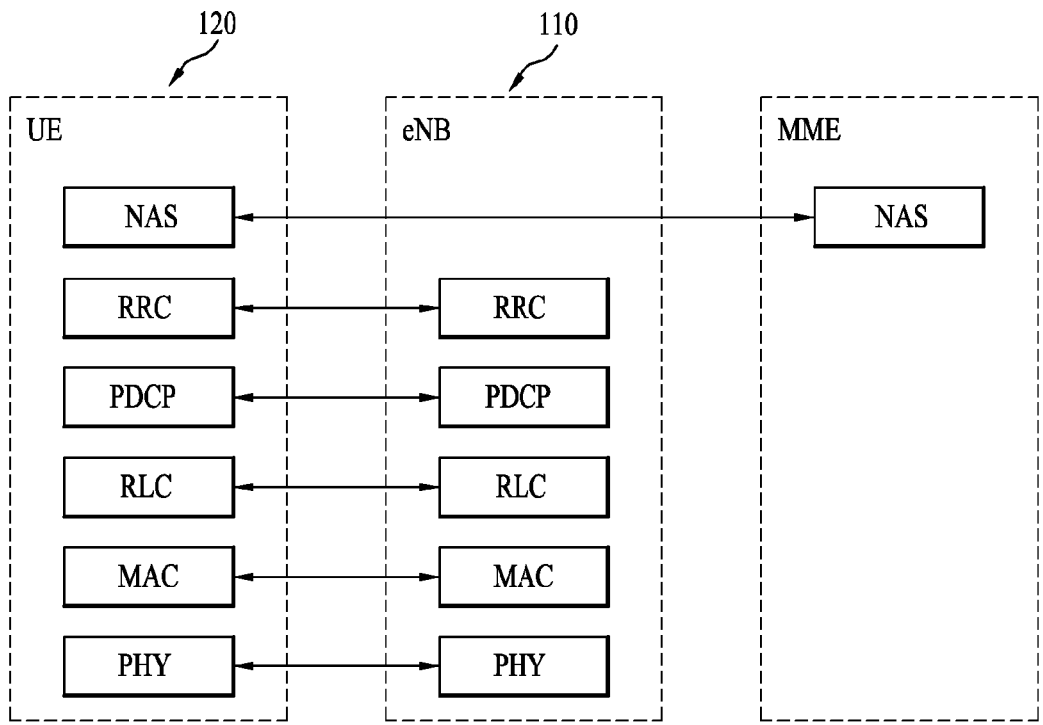
(a) Control-plane protocol stack
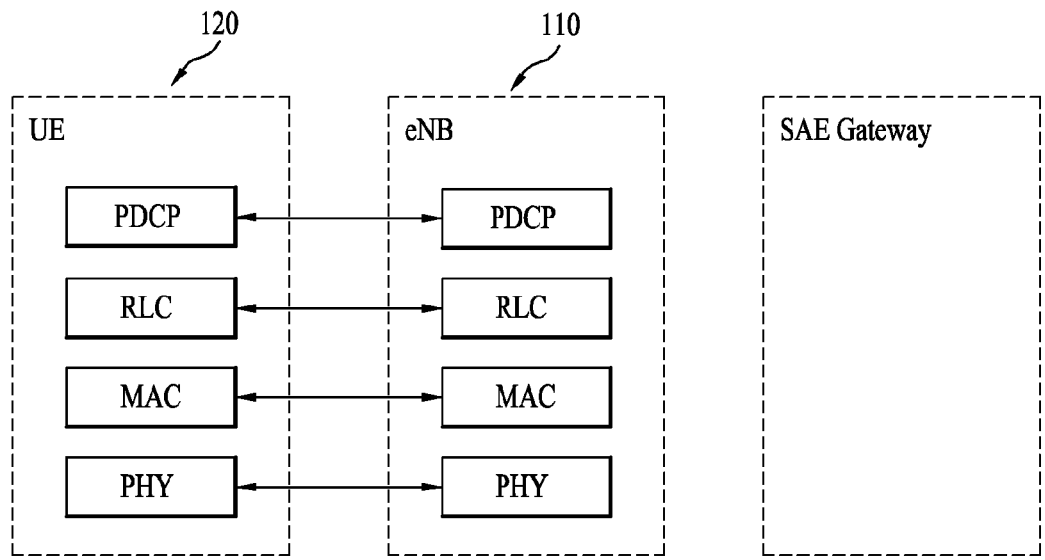
(b) User-plane protocol stack FIG. 6
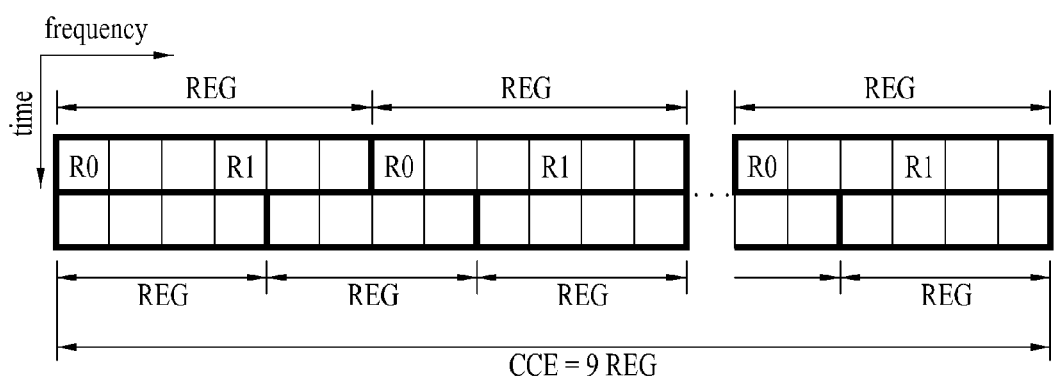
(a) 1 TX or 2 TX
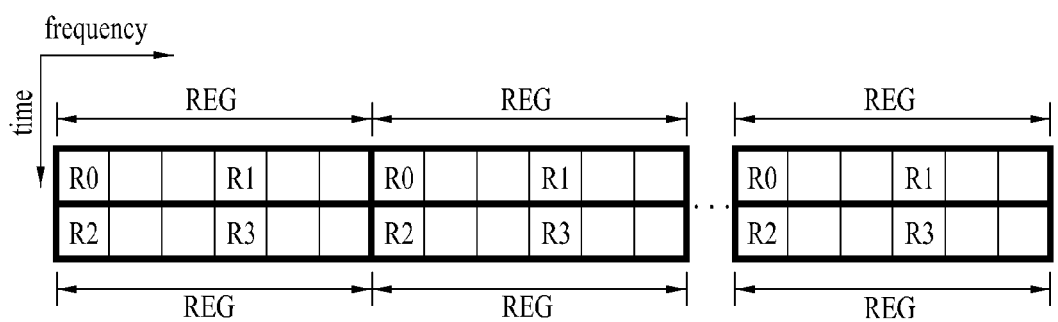
(b) 4 TX FIG. 16
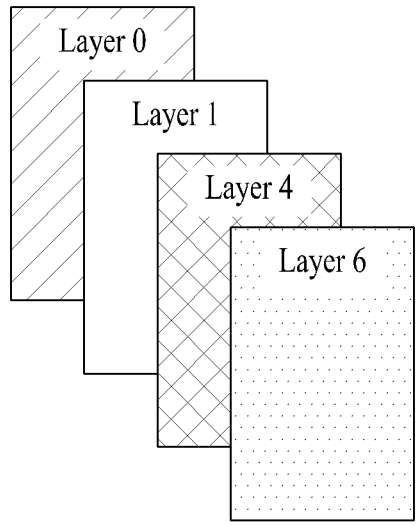
DMRS Group 1
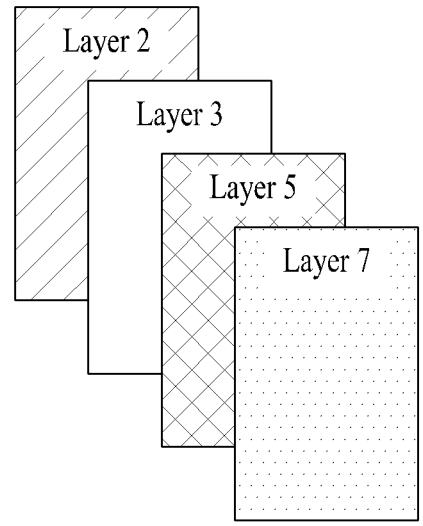
DMRS Group 2
FIG. 17
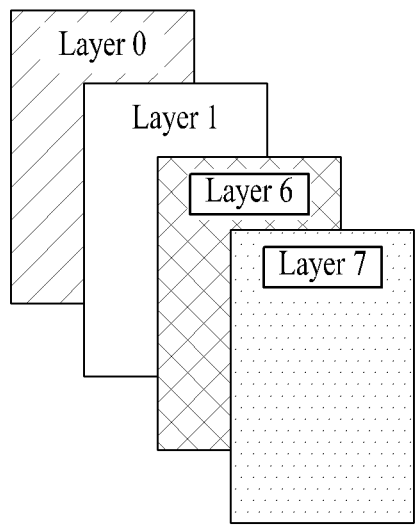
DMRS Group 1
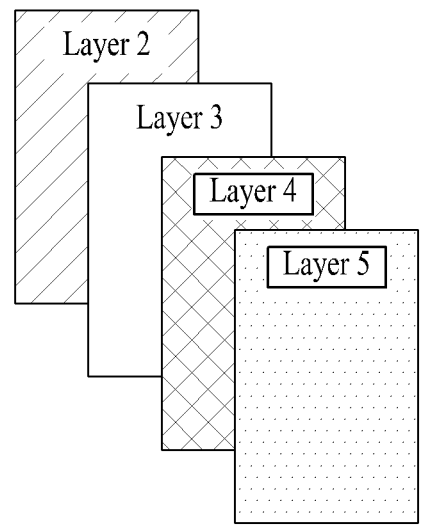
DMRS Group 2

FIG. 18
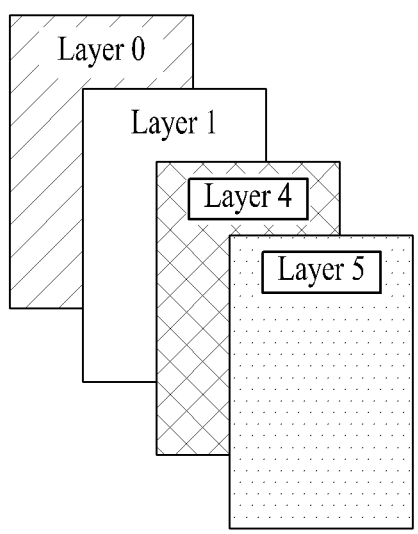
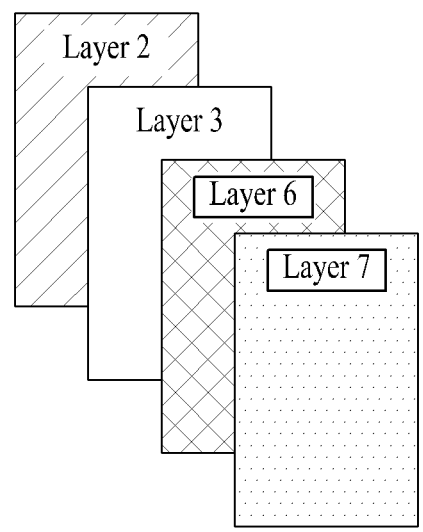
DMRS Group 1　　　　　　　　DMRS Group 2

METHOD FOR TRANSMITTING/RECEIVING SIGNAL BETWEEN BASE STATION AND RELAY NODE IN WIRELESS COMMUNICATION SYSTEM AND DEVICE THEREFOR

CROSS REFERENCE TO RELATED APPLICATIONS

This application is the National Phase of PCT/KR2012/002942 filed on Apr. 18, 2012, which claims priority under 35 U.S.C. 119(e) to U.S. Provisional Application No. 61/482,225 filed on May 4, 2011, U.S. Provisional Application No. 61/485,117 filed on May 11, 2011, U.S. Provisional Application No. 61/485,648 filed on May 13, 2011 and U.S. Provisional Application No. 61/487,255 filed on May 17, 2011, all of which are hereby expressly incorporated by reference into the present application.

TECHNICAL FIELD

The present invention relates to a wireless communication system, and more particularly, to a method for transceiving a signal between a base station and a relay node in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

One or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Task

Based on the above-mentioned discussion, a method for transceiving a signal between a base station and a relay node in a wireless communication system and apparatus therefor shall be proposed in the following description.

Technical Solution

To achieve these and other advantages and in accordance with the purpose of the present invention, as embodied and broadly described, a method of transmitting a downlink signal, which is transmitted to a receiving end by a transmitting end in a wireless communication system, according to one embodiment of the present invention includes the steps of mapping a downlink control channel to a specific resource block pair among one or more resource block pairs; mapping a downlink data channel to a $2^{nd}$ slot of the specific resource block pair and another resource block pairs of the one or more resource block pairs; and transmitting the downlink control channel and the downlink data channel to the receiving end, wherein a number of a spatial resource for the downlink control channel mapped to the $2^{nd}$ slot of the specific resource block pair is limited to be equal to or smaller than a predetermined number.

To further achieve these and other advantages and in accordance with the purpose of the present invention, as embodied and broadly described, in a wireless communication system, a transmitting apparatus according to another embodiment of the present invention includes a processor mapping a downlink control channel to a specific resource block pair among one or more resource block pairs, the processor mapping a downlink data channel to a $2^{nd}$ slot of the specific resource block pair and another resource block pairs of the one or more resource block pairs; and a wireless communication module configured to transmit the downlink control channel and the downlink data channel to a receiving end, wherein the processor limits a number of a spatial resource for the downlink control channel mapped to the $2^{nd}$ slot of the specific resource block pair to be equal to or smaller than a predetermined number.

Preferably, the spatial resource is a layer, and the predetermined number is 4. Preferably, the downlink data channel carries maximum 2 codewords, and the downlink data channel mapped to the $2^{nd}$ slot of the specific resource block pair carries 1 codeword only.

Preferably, a number of the spatial resource for the downlink control channel is limited to be equal to or smaller than a specific number. Preferably, the downlink control channel includes grant information for receiving the downlink data channel.

Preferably, a number of antenna ports for a reference signal mapped to the specific resource block pair is limited to be equal to or smaller than the predetermined number.

Advantageous Effects

According to an embodiment of the present invention, a base station and a relay node can efficiently transceive signals with each other.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of a radio interface protocol between a user equipment and E-UTRAN based on 3GPP radio access network specification.

FIG. 6 is a diagram of a resource unit used in configuring a control channel.

FIG. 16 is a diagram to describe an existing DM-RS antenna port mapping scheme.

FIG. 17 is a diagram for one example of a DM-RS antenna port mapping scheme according to a $3^{rd}$ embodiment of the present invention.

FIG. 18 is a diagram for another example of a DM-RS antenna port mapping scheme according to a $3^{rd}$ embodiment of the present invention.

BEST MODE FOR INVENTION

Figure 1:
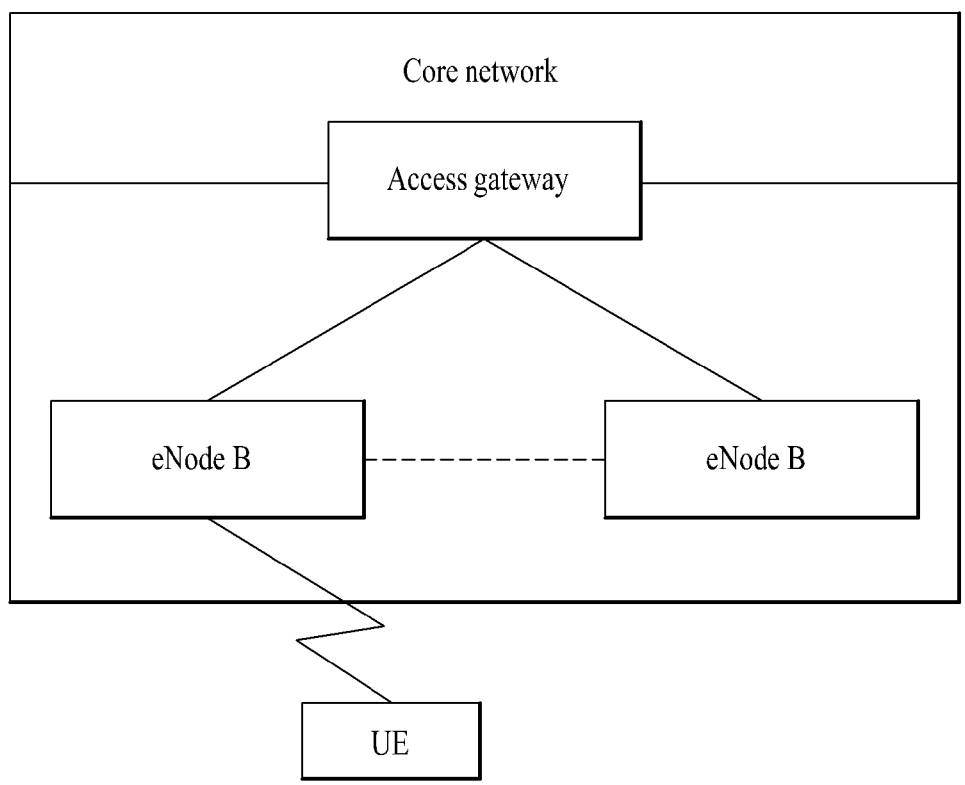
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on, a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10

MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
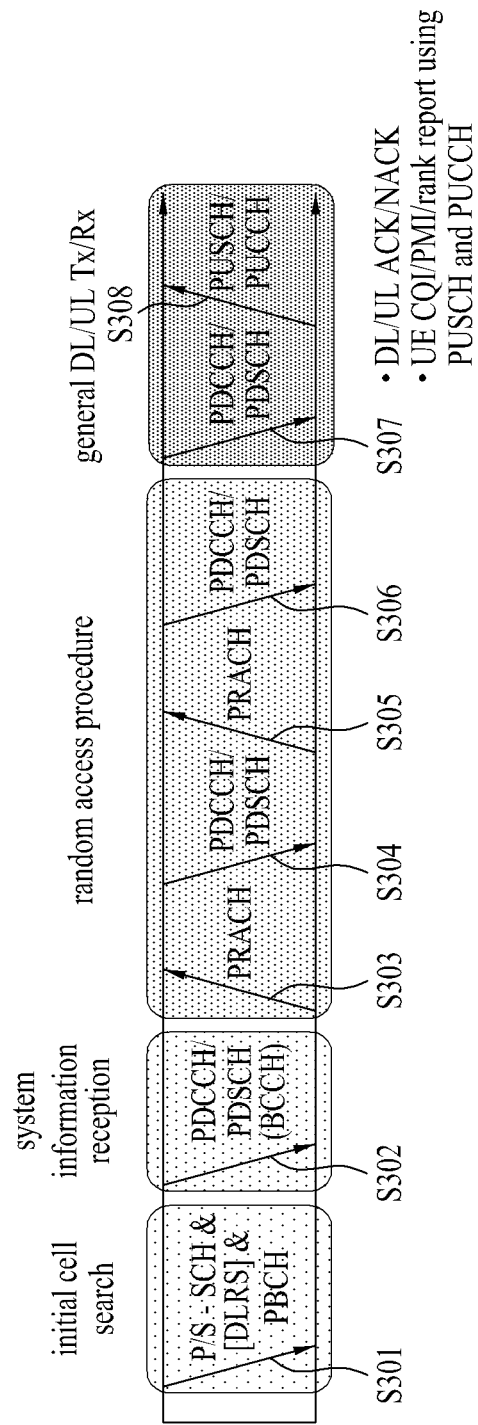
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303] and is then able to receive a response message via PDCCH and a corresponding PDSCH in response to the preamble [S304]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

In the following description, MIMO system is explained. First of all, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called 'multiple antennas (multi-antenna)'.

The MIMO technology does not depend on a single antenna path to receive one whole message. Instead, the MIMO technique completes data by putting fragments received via several antennas together. If the MIMO technique is adopted, a data transmission rate within a cell area having a specific size may be improved or a system coverage may be increased by securing a specific data transmission rate. Moreover, this technique may be widely applicable to a mobile communication terminal, a relay and the like. According to the MIMO technique, it may be able to overcome the transmission size limit of the related art mobile communication which used to use a single data.

Figure 4:
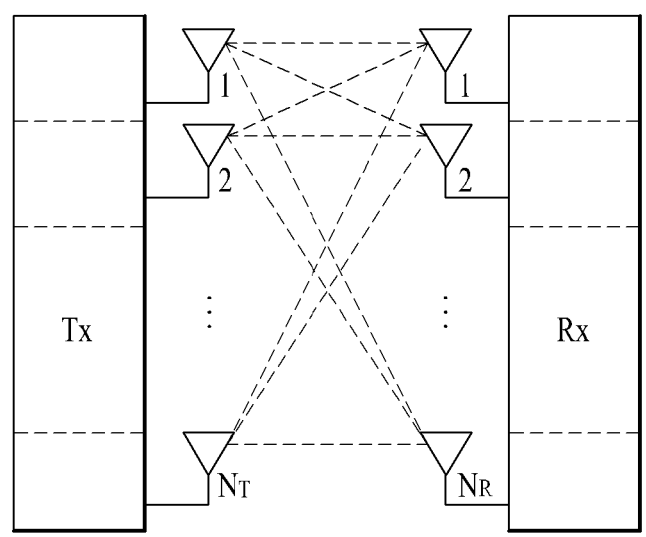
FIG. 4 is a diagram for a configuration of a general multi-antenna (MIMO) communication system.

FIG. 4 is a diagram for a configuration of a multi-antenna (MIMO) communication system explained in the description of the present invention. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_O$, the transmission rate in case of using multiple antennas may be theoretically raised by a result from multiplying the maximum transmission rate $R_O$ by a rate increasing rate $R_i$, as shown in Formula 1. In this case, $R_i$ is a smaller one of $N_T$ and $N_R$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 4, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s=[s_1,s_2,\ldots,s_{N_T}]^T \qquad \text{[Formula 2]}$$

Meanwhile, transmission powers can be set different from each other for transmission informations $S_1, s_2, \ldots, s_{N_T}$, respectively. If the transmission powers are set to $P_1, P_2, \ldots, P_{N_T}$, respectively, the transmission power adjusted transmission information can be represented as Formula 3.

$$\hat{s}=[\hat{s}_1,\hat{s}_2,\ldots,\hat{s}_{N_T}]^T=[P_1s_1,P_2s_2,\ldots,P_{N_T}s_{N_T}]^T \qquad \text{[Formula 3]}$$

And, Ŝ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector Ŝ. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} \qquad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \qquad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \qquad \text{[Formula 7]}$$

In this case, '# of streams' may indicate the number of stream(s). Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

Figure 5:
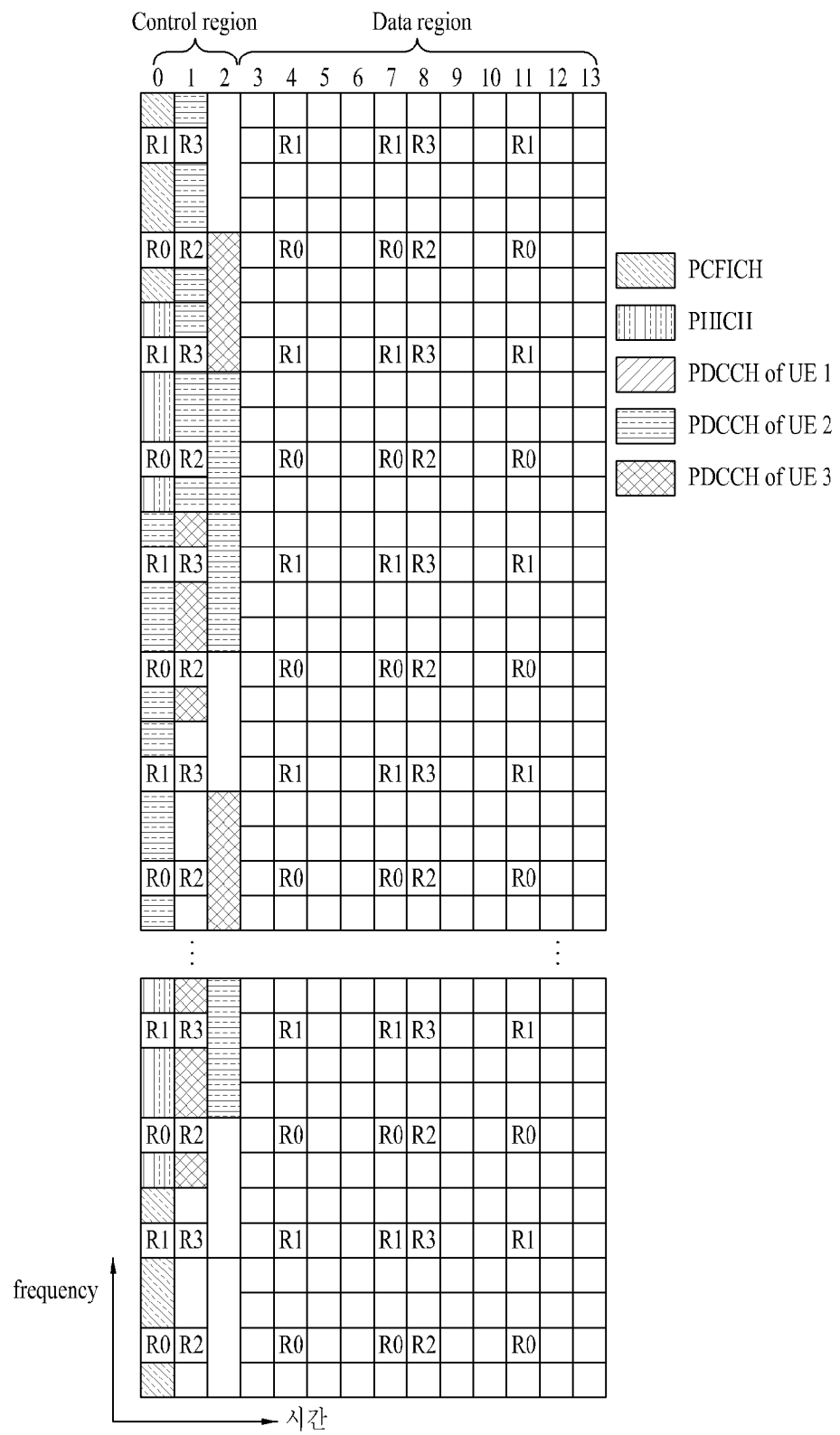
FIG. 5 is a diagram for one example of a structure of a downlink (DL) subframe used by LTE system.

FIG. 5 is a diagram for one example of a control channel included in a control region of a single subframe in a downlink (DL) radio frame.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

FIG. 6 is a diagram of a resource unit used in configuring a control channel in LTE system. In particular, FIG. 6 (a) shows a case that the number of transmitting antenna(s) of a base station is 1 or 2. And, FIG. 6 (b) shows a case that the number of transmitting antennas of a base station is 4. The cases shown in FIG. 6 only differ from each other in RS (reference signal) pattern but have the same method of configuring a resource unit related to a control channel.

Referring to FIG. 6, a basic resource unit of a control channel is REG. The REG includes 4 neighboring resource elements (REs) except RS. The REG is indicated by a bold line in the drawing. PCFICH and PHICH include 4 REGs and 3 REGs, respectively. PDCCH is configured by CCE (control channel elements) unit and one CCE includes 9 REGs.

A user equipment is set to check $M^{(L)}$ ($\geq L$) CCEs, which are contiguous to each other or arranged by specific rules, in order to check whether PDCCH configured with L CCEs is transmitted to the corresponding user equipment. The L value, which should be considered by the user equipment for PDCCH reception, may become a plural number. CCE sets, which should be checked by the user equipment for the PDCCH reception, are called a search space. For instance, LTE system defines a search space as Table 1.

TABLE 1

| Search space $S_k^{(L)}$ | | | | |
|---|---|---|---|---|
| Type | Aggregation level L | Size [in CCEs] | Number of PDCCH candidates $M^{(L)}$ | DCI formats |
| UE-specific | 1 | 6 | 6 | 0, 1, 1A, 1B, 2 |
| | 2 | 12 | 6 | |
| | 4 | 8 | 2 | |
| | 8 | 16 | 2 | |

TABLE 1-continued

| Search space $S_k^{(L)}$ | | | | |
|---|---|---|---|---|
| Type | Aggregation level L | Size [in CCEs] | Number of PDCCH candidates $M^{(L)}$ | DCI formats |
| Common | 4 | 16 | 4 | 0, 1A, 1C, 3/3A |
| | 8 | 16 | 2 | |

In Table 1, CCE aggregation level L indicates the number of CCEs configuring PDCCH, $S_k^{(L)}$ indicates a search space of the CCE aggregation level L, and $M^{(L)}$ indicates the number of PDCCH candidates supposed to be monitored in the search space of the aggregation level L.

The search space may be categorized into a UE-specific search space granting an access to a specific user equipment only and a common search space granting accesses to all user equipments in a cell. A user equipment monitors a common search space having a CCE aggregation level set to 4 or 8 and a UE-specific search space having a CCE aggregation level set to 1, 2, 4 or 8. And, the common search space and the UE-specific search space may overlap each other.

A position of a $1^{st}$ CCE (i.e., CCE having a smallest index) in PDCCH search space given to a random user equipment for each CCE aggregation level value may vary in each subframe according to a user equipment. This may be called a PDCCH search space hashing.

Figure 7:
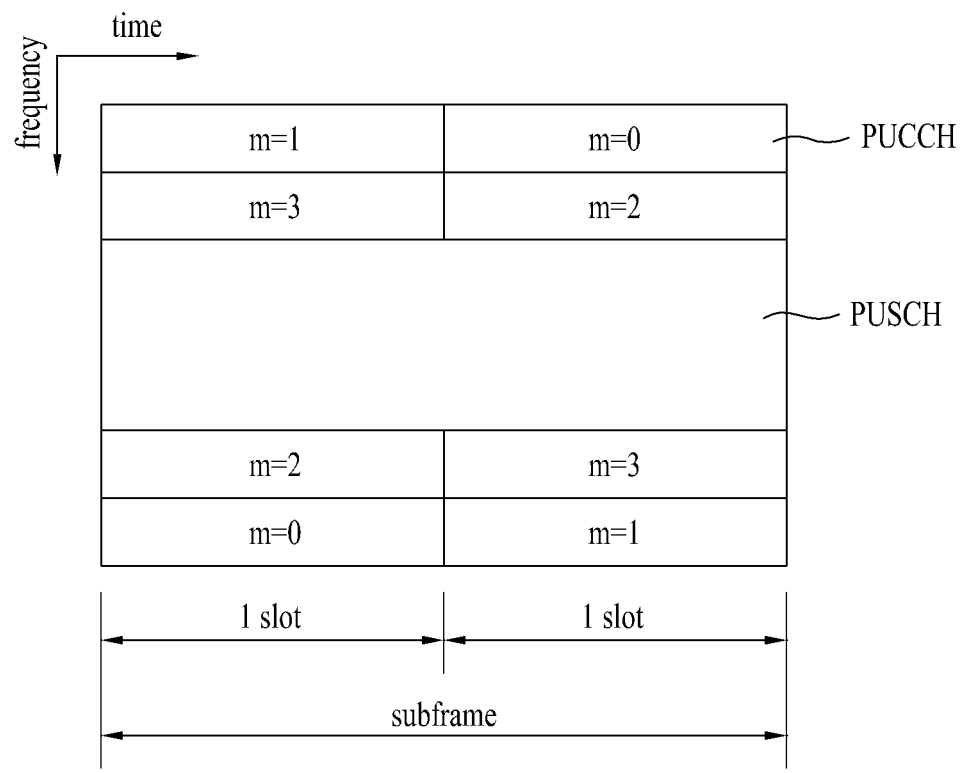
FIG. 7 is a diagram for one example of a structure of an uplink (UL) subframe used by LTE system.

FIG. 7 is a diagram for one example of a structure of an uplink (UL) subframe used by LTE system.

Referring to FIG. 7, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 7 shows one example that PUCCH (m=0), PUCCH (m=1), PUCCH (m=2), and PUCCH (m=3) are assigned to the subframe.

Meanwhile, if a channel status between a base station and a user equipment is poor, a relay node (RN) is installed between base station and the user equipment in order to provide a radio channel having a better channel status to the user equipment. In addition, a relay node is introduced to a cell edge region having a poor channel status to provide a high-speed data channel and to extend a cell service area. Thus, the relay node is being widely used to resolve the problem of the propagation shade region in a wireless communication system.

Compared to the conventional relay node having a restricted function of a repeater capable of amplifying and transmitting a signal, the latest relay node technology is being developed to cover more intelligent functions. Moreover, the relay node technology is the technology mandatory to reduce the cost requisite for establishing more base stations and the maintenance cost of a backhaul network in the next generation mobile communication system, to extend the service coverage, and to raise a data processing rate. As the relay node technology tends to be further developed, the necessity for a relay node used in the conventional wireless communication system to be supported by the new wireless communication system is rising correspondingly.

As a relay node is introduced to play a role in forwarding a link connection between a base station and a user equipment in 3GPP LTE-A (3rd generation partnership project long term evolution-advanced) system, two kinds of links differing from each other in attributes are applied to a UL carrier frequency band and a DL carrier frequency band, respectively. A connection link part established between the base station and the relay node may be represented by being defined as a backhaul link. If a transmission is performed by FDD (Frequency Division Duplex) or TDD (Time Division Duplex) using a downlink resource, it may be represented as a backhaul downlink. If a transmission is performed by FDD or TDD using an uplink resource, it may be represented as a backhaul uplink.

Figure 8:
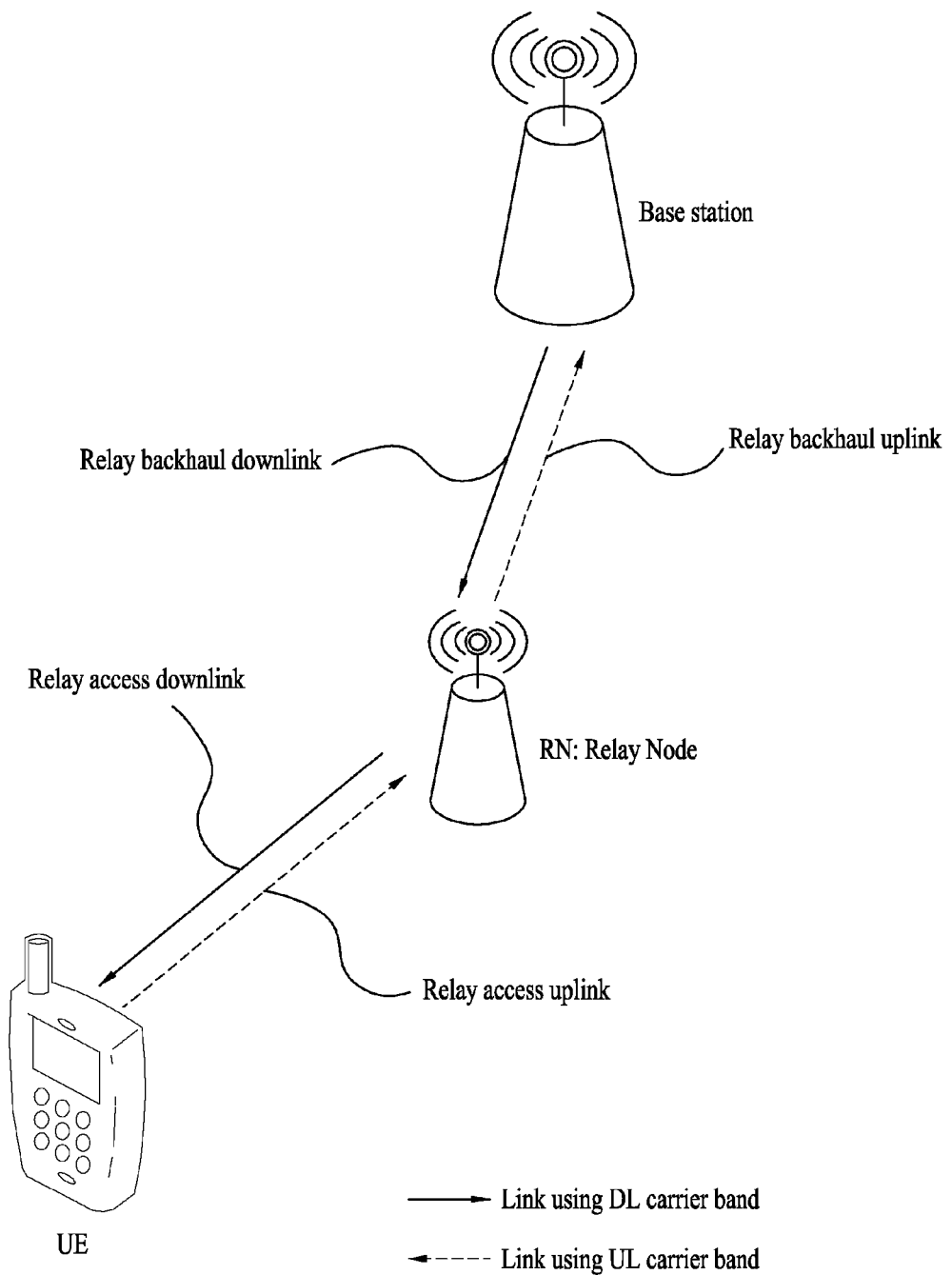
FIG. 8 is a diagram for configurations of a relay backhaul link and a relay access link in a wireless communication system.

FIG. 8 is a diagram for configurations of a relay backhaul link and a relay access link in a wireless communication system.

Referring to FIG. 8, as a relay node is introduced to play a role in forwarding a link connection between a base station and a user equipment, two kinds of links differing from each other in attributes are applied to a UL carrier frequency band and a DL carrier frequency band, respectively. A connection link part established between the base station and the relay node may be represented by being defined into a relay backhaul link. If a transmission is performed in a manner that a backhaul link uses a DL frequency band resource (e.g., the case of Frequency Division Duplex (FDD)) or a DL subframe resource (e.g., the case of Time Division Duplex (TDD)), it may be represented as a backhaul downlink. If a transmission is performed in a manner that a backhaul link uses a UL frequency band resource (e.g., the case of FDD) or a UL subframe resource (e.g., the case of TDD), it may be represented as a backhaul uplink.

On the other hand, a connection link part established between a relay node (RN) and a series of user equipments may be represented by being defined into a relay access link. If a transmission is performed in a manner that the relay access link uses a downlink frequency band resource (e.g., the case of FDD) or a downlink subframe resource (e.g., the case of TDD), it may be represented as an access downlink. If a transmission is performed in a manner that the relay access link uses an uplink frequency band resource (e.g., the case of FDD) or an uplink subframe resource (e.g., the case of TDD), it may be represented as an access uplink.

A relay node (RN) can receive information from a base station in a relay backhaul downlink and is able to transmit information to the base station in a relay backhaul uplink. In addition, the relay node can transmit information to the user equipment in a relay access downlink or is able to receive information from the user equipment in a relay access uplink.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment communicates with a network through a relay node. And, the 'non-transparent' may mean a case that a user equipment is able to recognize whether the user equipment communicates with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identifier (ID), the relay node does not have a cell identity of its own. If at least one portion of RRM (Radio Resource Management) is controlled by a base station having the donor cell belong thereto (despite that the rest of the RRM is located at the relay node), the above-mentioned relay node may be considered as a relay node (RN) configured as a part of the donor cell. Preferably, this relay node can support a legacy user equipment. For example, smart repeaters, decode-and-forward relays, various species of L2 ($2^{nd}$ layer) relay nodes, and type-2 relay nodes may correspond to the above-mentioned relay nodes.

Regarding a relay node configured to self-control a cell, this relay node controls one or more cells, a unique physical layer cell identity is provided to each cell controlled by the relay node, and the same RRM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 ($3^{rd}$ layer) relay node, a type-1 relay node, and a type-1a relay node may correspond to the above-mentioned relay nodes.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may transmit a synchronization channel of its own, a reference signal and the like. In case of a single-cell operation, a user equipment may directly receive scheduling information and HARQ feedback from a relay node and may transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1a relay node is operated in the out-band, and has the same features as those of the type-1 relay node. Operation of the type-1a relay node may be configured to minimize (or eliminate) the influence on L1 ($1^{st}$ layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, in order for a relay node to operate in in-band, prescribed resources in time-frequency space must be reserved for a backhaul link and these resources may be configured not be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.]. Similarly, a backhaul uplink and an access uplink may be multiplexed together on a single carrier frequency by TDM [i.e., either the backhaul uplink or the access uplink is activated in specific time].

Regarding the backhaul link multiplexing by FDD, a backhaul downlink transmission may be described as performed on a downlink frequency band, and a backhaul uplink transmission may be described as performed on an uplink frequency band. Regarding the backhaul link multiplexing by TDD, a backhaul downlink transmission may be described as performed in a downlink subframe of a base station or a relay node, and a backhaul uplink transmission may be described as performed in an uplink subframe of the base station or the relay node.

In case of an in-band relay ode, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on or under the ground)].

As one solution for the above signal interference problem, a relay node is set not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 9:
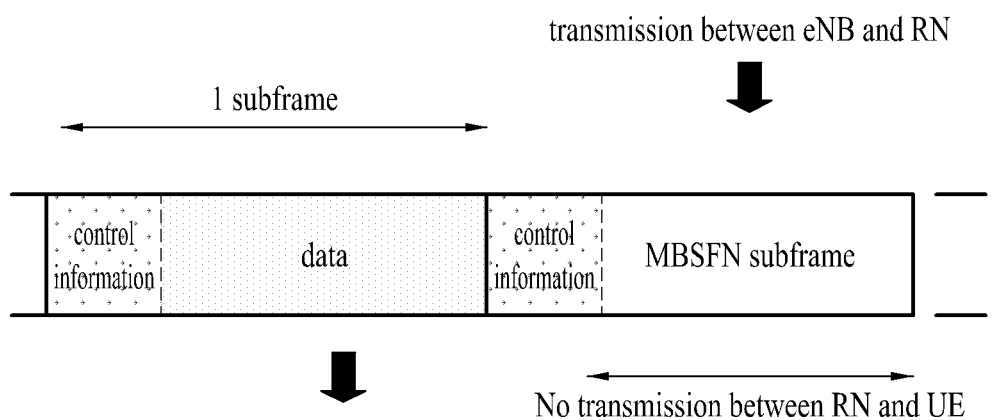
FIG. 9 is a diagram for one example of relay node resource partition.

FIG. 9 is a diagram for one example of relay node resource partitioning.

Referring to FIG. 9, in a first subframe that is a normal subframe, a downlink (i.e., an access downlink) control signal and data are transmitted from a relay node to a user equipment. In a second subframe that is an MBSFN subframe, while a control signal is transmitted from the relay node to the user equipment on a control region of a downlink subframe but any transmission from the relay node to the user equipment is not performed in the rest region of the downlink subframe. In doing so, since a legacy user equipment expects a transmission of physical downlink control channel (PDCCH) in all downlink subframes (i.e., the relay node needs to support legacy user equipments within a coverage of the relay node to receive PDCCH in each subframe and to perform a measurement function thereof), it is necessary for the PDCCH to be transmitted in all the downlink subframes in order for each legacy user equipment to operate correctly. Therefore, in a subframe (e.g., second subframe) configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH is transmitted from the relay node to the user equipment in a control region of the second subframe, it is able to provide backward compatibility with a legacy user equipment served by the relay node. While no signal is transmitted in the rest region of the second subframe from the relay node, the relay node may be able to receive a transmission from the base station. Therefore, the above-mentioned resource partitioning scheme can prevent the access downlink transmission and the backhaul downlink reception from being simultaneously performed by the in-band relay node.

The second subframe, which uses the MBSFN subframe, shall be described in detail as follows. First of all, a control region of the second subframe may be referred to as a relay node non-hearing interval. In particular, the relay node non-hearing interval may mean the interval in which a relay node transmits an access downlink signal instead of receiving a backhaul downlink signal. As mentioned in the foregoing description, this relay node non-hearing interval may be configured to have 1-, 2- or 3-OFDM length. In the relay node non-hearing interval, a relay node performs an access downlink transmission to a user equipment and may receive a backhaul downlink from a base station in the rest of the relay node non-hearing interval. In doing so, since the relay node is unable to perform both transmission and reception on the same frequency band, it may take a time to enable the relay node to be switched from a transmitting mode to a receiving mode. Hence, it may be necessary to configure a guard time (GT) to enable the relay node to perform a transmitting/receiving mode switching in first partial interval of a backhaul downlink receiving region. Similarly, even if the relay node operates in a manner of receiving a backhaul downlink from the base station and transmitting and access downlink to the user equipment, it may be able to configure a guard time (GT) for the transmitting/receiving mode switching of the relay node. The length of the guard time may be defined as a value in time domain. For example, the length of the GT may be defined as k time samples (Ts) (where, k≥1) or may be set to the length of one or more OFDM symbols. Alternatively, in case that relay node backhaul downlink subframes are contiguously configured or in accordance with a prescribed subframe timing alignment relation, the guard time of a last part of a subframe may be defined or may not configured. In order to maintain backward compatibility, this guard time may be defined only in a frequency domain configured for a backhaul downlink subframe transmission (i.e., a legacy user equipment is not supportable if a guard time is configured in an access downlink interval). In the backhaul downlink receiving interval except the guard time, the relay node may be able to receive relay node dedicated PDCCH and PDSCH from the base station. In the meaning of a relay node dedicated physical channel, the PDCCH and the PDSCH may also be represented as Relay-PDCCH (R-PDCCH) and R-PDSCH (Relay-PDSCH), respectively.

In the following description, reference signals are explained in detail.

First of all, a reference signal already known to both a transmitting side and a receiving side is generally transmitted for channel measurement to the receiving side from the transmitting side together with data. This reference signal is provided for the channel measurement and also indicates a modulation scheme to play a role in enabling a demodulation process. Reference signals can be categorized into a dedicated reference signal (DRS) for a specific user equipment (UE) and a dedicated reference signal for a base station, i.e., a UE-specific reference signal and a common reference signal (common RS or CRS (cell-specific RS) that is a cell-specific reference signal for all user equipments within a cell. Moreover, the cell-specific reference signal includes a reference signal for measuring and reporting CQI/PMI/RI to a base station from a user equipment. And, such a reference signal is called CSI-RS (channel state information-RS).

Figure 10:
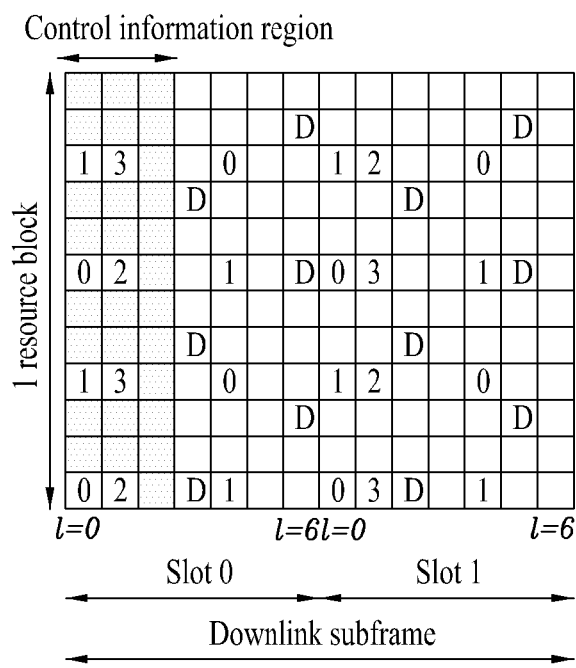
FIG. 10 and FIG. 11 are diagrams for structures of a downlink reference signal in LTE system supportive of a downlink transmission using 4 antennas.
Figure 11:
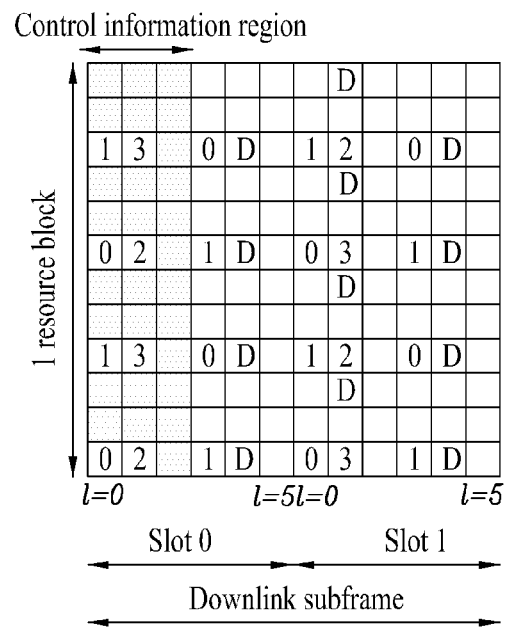

FIG. 10 and FIG. 11 are diagrams for structures of a downlink reference signal in LTE system supportive of a downlink transmission using 4 antennas. Particularly, FIG. 10 shows a case of a normal cyclic prefix and FIG. 11 shows a case of an extended cyclic prefix.

Referring to FIG. 10 and FIG. 11, numerals 0 to 3 entered in a grid correspond to antenna ports 0 to 3 and mean a common reference signal (CRS) that is a cell-specific reference signal transmitted for channel measurement and data demodulation. The cell-specific reference signal CRS can be transmitted to a user equipment across a control information region overall as well as across a data information region.

'D' entered in the grid means a downlink DM-RS (demodulation-RS) that is a UE-specific RS. The DM-RS supports a single antenna port transmission on PDSCH. A user equipment receives a signaling of a presence or non-presence of DM-RS, which is a UE-specific RS, through an upper layer. FIG. 10 and FIG. 11 show examples of DM-RS corresponding to an antenna port 5. In 3GPP standard document 36.211, DM-RS for antenna ports 7 to 14 is defined as well.

Meanwhile, OCC (orthogonal code cover) can be applied to DM-RS as shown in Table 2.

TABLE 2

| Antenna port p | $[\overline{w}_p(0)\ \overline{w}_p(1)\ \overline{w}_p(2)\ \overline{w}_p(3)]$ |
| --- | --- |
| 7  | [+1 +1 +1 +1] |
| 8  | [+1 −1 +1 −1] |
| 9  | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The OCC means a code available for a sequence with mutual orthogonality. Although difference sequences are usable to discriminate a plurality of channels from each other in general, it is able to discriminate a plurality of channels using OCC.

In general, DM-RS identifies a channel based on a cyclic shift value. And, DM-RS defined in a current LTE standard, i.e., 3GPP standard documents is designed to support a transmission of rank 8. Hence, in order to discriminate a plurality of layers from each other, a different cyclic shift value can be assigned to DM-RS for each layer. As the number of layers increases, a cyclic shift value to be assigned should increase correspondingly. Hence, an interval between cyclic shift values decreases as well. If so, it is difficult to discriminate a plurality of channels from each other to degrade channel estimation performance. To overcome such difficulty, it is able to apply OCC to each layer.

Figure 12:
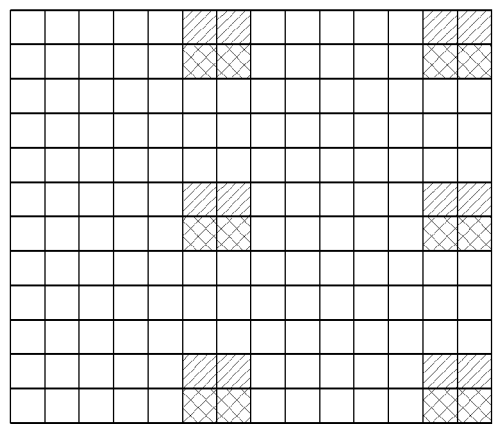
FIG. 12 is a diagram for one example of downlink DM-RS assignment currently defined in 3GPP standard document.

FIG. 12 is a diagram for one example of DM-RS assignment currently defined in 3GPP standard documents.

Referring to FIG. 12, DM-RS corresponding to antenna port {7, 8, 11, 13} is mapped to DM-RS Group 1 using a sequence per antenna port shown in Table 2. Likewise, DM-RS corresponding to antenna port {9, 10, 12, 14} is mapped to DM-RS Group 2 using a sequence per antenna port shown in Table 2.

Hence, layers 0 to 3 (or antenna ports 7 to 10) can perform de-spreading of a spreading factor 2 using two DM-RS groups and two sequences ([+1+1+1+1], [+1−1+1−1]) by FIG. 12 and Table 2, i.e., despreading using DM-RS of a $1^{st}$ slot only.

In summary, according to the 3GPP standard documents and Table 2, DM-RS for the layers 0 to 3 spreads by a spreading factor 2 owing to the property of OCC applied to the DM-RS. Since the spreading signal appears once in each slot, even if a receiving end uses a signal of a single slot only, despreading is possible. In particular, slot-based channel estimation is possible.

On the other hand, DM-RS for the layers 4 to 7 spreads across 2 slots by a spreading factor 4 and share time/frequency resource with the former DM-RS for the layers 0 to 3, it can despread only after receiving all signals of the two slots. Hence, a subframe based channel estimation, i.e., a channel estimation using all DM-RS transmitted across two slots should be performed.

Figure 13:
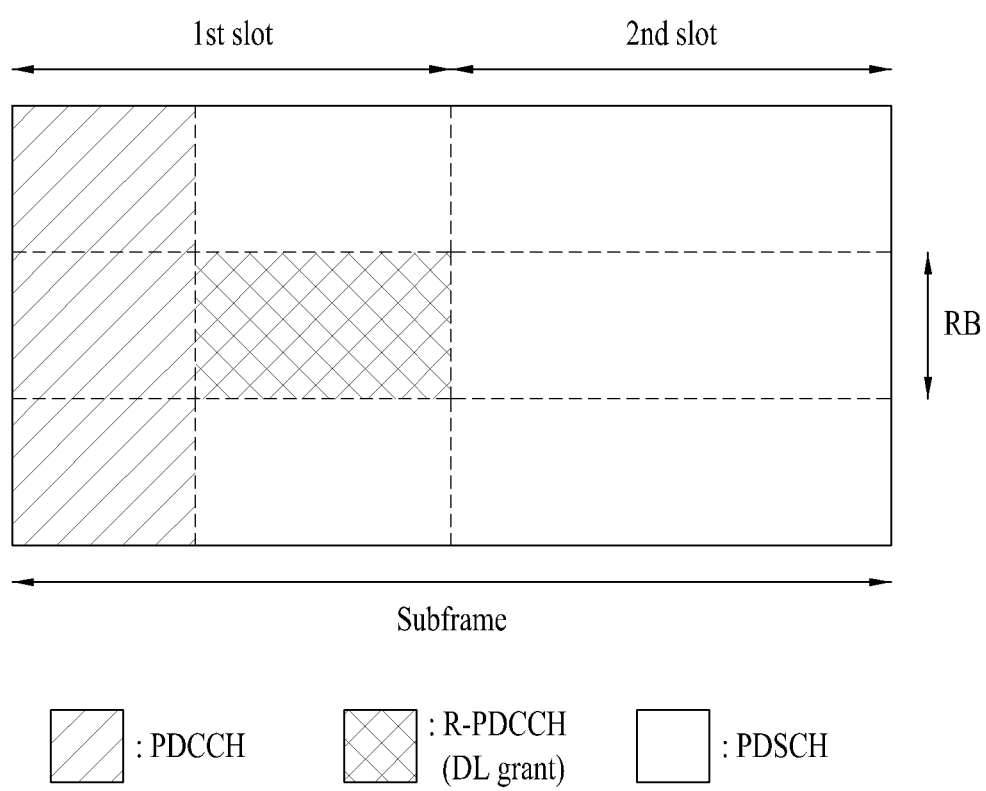
FIG. 13 is a diagram for one example of a resource available for a backhaul downlink transmission between an eNB and a relay node (RN).

FIG. 13 is a diagram for one example of a resource available for a backhaul downlink transmission between an eNB and a relay node (RN).

If a resource shown in FIG. 13 is used, a presence or non-presence of early decoding support may be the key to performance evaluation. In particular, in FIG. 13, R-PDCCH is early decoded and PDSCH decoding is then performed depending on a decoding result. If the decoding is not performed early, the decoding of the DSCH is delayed as well. Hence, it may cause such an additional overhead as modification of HARQ ACK/NACK timing and the like.

To this end, a method of decoding R-PDCCH using RS in R-PDCCH region only without using RS of PDSCH region is necessary. Moreover, when an early decoding is performed using RS in R-PDCCH only, a DL reception procedure needs to be amended to prevent a problem from being caused.

As mentioned in the foregoing description, in case that a transmission at Rank 5 or higher is performed in a $2^{nd}$ slot of a PRB pair for carrying a DL grant, it is necessary to receive DM-RS of the $2^{nd}$ slot to despread DM-RS for decoding the DL grant. Hence, even if R-PDCCH stops being transmitted in the $1^{st}$ slot, since a channel estimation is possible only if the DM-RS of the $2^{nd}$ slot is received. Hence, an early decoding is impossible.

According to the present invention, for clarity of the following description, assume to layer of indexes 0 to 7 (Rank 8 transmission) and also assume that a single layer is transmitted through a single antenna port. Moreover, assume that a layer index and a rank interoperate with each other. In particular, in Rank 2 transmission, assume that a layer 0 and a layer 1 are transmitted. In Rank 6 transmission, assume that layers 0 to 5 are transmitted.

$1^{st}$ Embodiment

According to a $1^{st}$ embodiment of the present invention, when a DL grant, i.e., R-PDCCH, is transmitted, it is proposed that configuration of PRB transmitted on each layer is set different for each layer in order to perform an early decoding.

In particular, if PDSCH of Rank 5 or higher is transmitted, it is proposed that the transmission is performed on layers 0 to 3 using all PRBs available for PDSCH. On layers 4 to 7, it is proposed that data is not transmitted in a $2^{nd}$ slot of the R-PDCCH detected PRB pair through a rate matching, a puncturing, or the like. Therefore, in a $2^{nd}$ slot of a PRB pair having R-PDCCH transmitted in its $1^{st}$ slot among PRB pairs assigned to PDSCH, DM-RS and data of the layers 0 to 3 are transmitted and DM-RS and data of the layers 4 to 7 do not exist.

Figure 14:
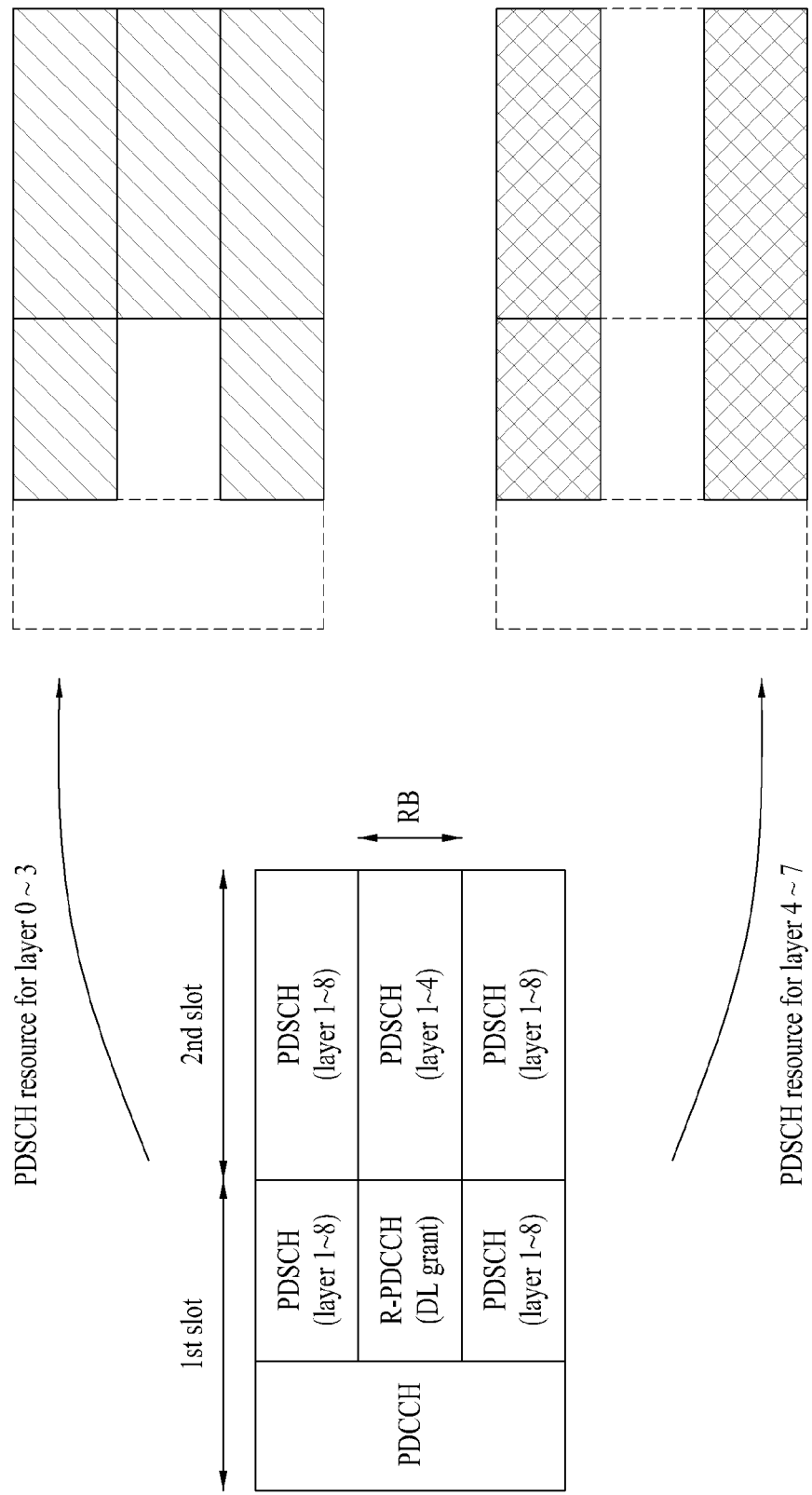
FIG. 14 is a diagram for one example of transmitting R-PDCCH and PDSCH according to a $1^{st}$ embodiment of the present invention.

FIG. 14 is a diagram for one example of transmitting R-PDCCH and PDSCH according to a $1^{st}$ embodiment of the present invention. Particularly, in FIG. 14, assume Rank 8 transmission. And, assume that 3 PRB pairs are assigned to PDSCH for a corresponding RN.

Referring to FIG. 14, whether to perform PDSCH mapping on a $2^{nd}$ slot of a PRB pair for carrying a DL grant, i.e., R-PDCCH, is determined depending on a layer index. In particular, it can be observed that a PDSCH mapped region of layers 0 to 3 is different from a PDSCH mapped region of layers 4 to 7.

Through this method, since DM-RS and data of the layers 0 to 3 remain in the $2^{nd}$ slot of the R-PDCCH transmitted PRB pair, a slot based channel estimation is possible in the R-PDCCH transmitted PRB pair in Rank 8 transmission, which means that an early decoding is possible.

In the above description, it is assumed that PDSCH of any layer is not mapped to a DL grant transmitted resource region for the reliance of control channel decoding. Yet, in order to raise the degree of resource utilization, PDSCH may be mapped to a corresponding resource (i.e., a DL grant transmitted resource) in another layer except the DL grant transmitted layer. In this case, the above-mentioned operation, i.e., an operation of mapping layers 0 to 3 to the $2^{nd}$ slot of the DL grant transmitted PRB pair only is applicable to both slots of the DL grant transmitted PRB pair.

According to the above-described $1^{st}$ embodiment, it is proposed that the $2^{nd}$ slot of the DL grant transmitted subframe (i.e., R-PDCCH transmitted subframe) has a maximum transmittable layer number limited to 4 despite Rank 4~7 transmission. In particular, it is proposed that the layers 0 to 3 (i.e., antenna ports 7 to 10) are transmitted in the $2^{nd}$ slot of the R-PDCCH transmitted subframe only.

Moreover, in the current 3GPP standard documents, codeword-layer mapping for space multiplexing is defined as Table 3.

TABLE 3

| No. of layers | No. of codewords | Codeword-Layer Mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 1 | $x^{(0)}(i) = d^{(0)}(3i)$ $x^{(1)}(i) = d^{(0)}(3i+1)$ $x^{(2)}(i) = d^{(0)}(3i+2)$ | $M_{symb}^{layer} = M_{symb}^{(0)}/3$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 1 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ | $M_{symb}^{layer} = M_{symb}^{(0)}/4$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |
| 5 | 2 | $x^{(0)}(i) = d^{(0)}(2i)$ $x^{(1)}(i) = d^{(0)}(2i+1)$ $x^{(2)}(i) = d^{(1)}(3i)$ $x^{(3)}(i) = d^{(1)}(3i+1)$ $x^{(4)}(i) = d^{(1)}(3i+2)$ | $M_{symb}^{layer} = M_{symb}^{(0)}/2 = M_{symb}^{(1)}/3$ |

TABLE 3-continued

| No. of layers | No. of codewords | Codeword-Layer Mapping $i = 0, 1, \ldots, M_{symb}^{layer} - 1$ | |
|---|---|---|---|
| 6 | 2 | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(3i)$ $x^{(4)}(i) = d^{(1)}(3i+1)$ $x^{(5)}(i) = d^{(1)}(3i+2)$ | $M_{symb}^{layer} = M_{symb}^{(0)}/3 = M_{symb}^{(1)}/3$ |
| 7 | 2 | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(4i)$ $x^{(4)}(i) = d^{(1)}(4i+1)$ $x^{(5)}(i) = d^{(1)}(4i+2)$ $x^{(6)}(i) = d^{(1)}(4i+3)$ | $M_{symb}^{layer} = M_{symb}^{(0)}/3 = M_{symb}^{(1)}/4$ |
| 8 | 2 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ $x^{(4)}(i) = d^{(1)}(4i)$ $x^{(5)}(i) = d^{(1)}(4i+1)$ $x^{(6)}(i) = d^{(1)}(4i+2)$ $x^{(7)}(i) = d^{(1)}(4i+3)$ | $M_{symb}^{layer} = M_{symb}^{(0)}/4 = M_{symb}^{(1)}/4$ |

In this case, looking into Table 3, it can be observed that 2 codewords are used for Rank 5~8 transmission. And, each of the codewords is transmitted in a manner of being divided into a multitude of layers depending on a rank.

Looking into Table 2, it can be observed that R-PDCCH early decoding using DM-RS of a $1^{st}$ slot is available for antenna ports 7 to 10 having layers 0 to 3 mapped thereto only. For instance, if the $1^{st}$ embodiment of the present invention is applied by being mapped by the codeword-layer mapping scheme shown in Table 3, transmission at Rank 5 or higher can be performed in a manner shown in Table 4.

TABLE 4

| | Rank 5 | Rank 6 | Rank 7 | Rank 8 |
|---|---|---|---|---|
| Layer 0 | CW0 | CW0 | CW0 | CW0 |
| Layer 1 | CW0 | CW0 | CW0 | CW0 |
| Layer 2 | CW1 | CW0 | CW0 | CW0 |
| Layer 3 | CW1 | CW1 | CW1 | CW0 |
| Layer 4 | CW1 | CW1 | CW1 | CW1 |
| Layer 5 | | CW1 | CW1 | CW1 |
| Layer 6 | | | CW1 | CW1 |
| Layer 7 | | | | CW1 |

In Table 4, CW0 or CW1 means that each CW is transmitted in a manner of being divided onto a corresponding layer. For instance, CW0 is transmitted by being divided onto Layer 0 and Layer 1 in Rank 5 transmission. Although CW1 is transmitted by being divided onto Layers 2 to 4, it is transmitted on Layer 2 and Layer 3 in a $2^{nd}$ slot of an R-PDCCH transmitted subframe only. In doing so, Layer 4 should be emptied in a manner of puncturing or rate-matching the corresponding resource (i.e., the $2^{nd}$ slot of the R-PDCCH transmitted subframe). In Table 4, a part denoted by gray means that the corresponding layer is punctured or rate-matched in the $2^{nd}$ slot of the R-PDCCH transmitted subframe.

$2^{nd}$ Embodiment

Additionally, the present invention proposes another embodiment for Rank 5~8 transmission.

According to the codeword-layer mapping scheme shown in Table 3, if codeword 2 is transmitted in a $2^{nd}$ slot of a DL grant transmitted PRB pair in a transmission at Rank 5 or higher, since a spreading factor increases to 4, it causes a problem that an early decoding of a DL grant is impossible.

Therefore, if it is restricted that a single CW (e.g., CW0) is transmitted in the $2^{nd}$ slot of the R-PDCCH transmitted subframe, it is able to implement the early decoding. In doing so, layers, to which other codewords are mapped, can be emptied through puncturing or rate-matching the corresponding resource (e.g., the $2^{nd}$ slot of the R-PDCCH transmitted subframe).

So to speak, in order to secure an early decoding of R-PDCCH in a transmission at Rank 5 or higher, i.e., in order to maintain a spreading factor 2 in a corresponding PRB pair, it is preferable that layers corresponding to a $1^{st}$ codeword are transmitted in a $2^{nd}$ slot of a DL grant transmitted PRB pair. In doing so, Codeword 2 may not transmit data in the corresponding resource, i.e., in the $2^{nd}$ slot of the DL grant transmitted subframe using a rate matching, a puncturing or the like.

Figure 15:
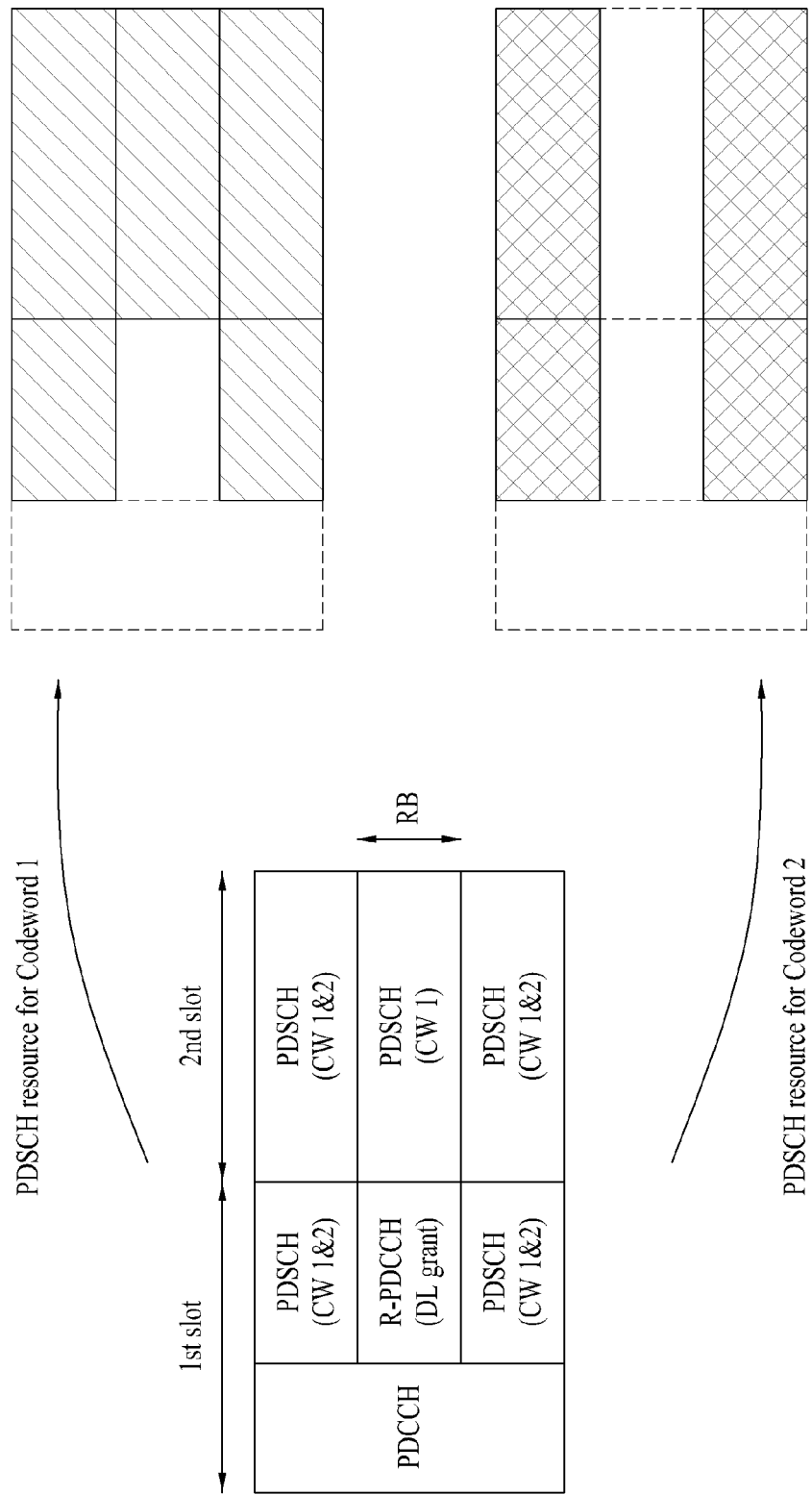
FIG. 15 is a diagram for one example of transmitting R-PDCCH and PDSCH according to a $2^{nd}$ embodiment of the present invention.

FIG. 15 is a diagram for one example of transmitting R-PDCCH and PDSCH according to a $2^{nd}$ embodiment of the present invention. Particularly, FIG. 15 represents the example shown FIG. 14 in aspect of codeword.

Table 5 in the following shows one example of applying codeword restriction using an existing codeword-layer mapping. Yet, according to Table 5, it is disadvantageous in that a non-transmitting layer is generated despite that a transmission is available.

TABLE 5

|         | Rank 5 | Rank 6 | Rank 7 | Rank 8 |
|---------|--------|--------|--------|--------|
| Layer 0 | CW0    | CW0    | CW0    | CW0    |
| Layer 1 | CW0    | CW0    | CW0    | CW0    |
| Layer 2 | CW1    | CW0    | CW0    | CW0    |
| Layer 3 | CW1    | CW1    | CW1    | CW0    |
| Layer 4 | CW1    | CW1    | CW1    | CW1    |
| Layer 5 |        | CW1    | CW1    | CW1    |
| Layer 6 |        |        | CW1    | CW1    |
| Layer 7 |        |        |        | CW1    |

In Table 5, a part denoted by gray also means that a corresponding layer (or a corresponding codeword) is punctured or rate-matched in a $2^{nd}$ slot of an R-PDCCH transmitted subframe.

Alternatively, it is able to consider a method of using a new codeword-layer mapping scheme shown in Table 6 in an R-PDCCH transmitted subframe. This scheme is applicable to a case that R-PDCCH does not exist. In particular, CW0 is proposed to be mapped to Layers 0 to 3 in a transmission at Rank 5 or higher and CW1 is proposed to be mapped to the rest of layers at the corresponding rank. Alternatively, of course, CW1 can be mapped to Layers 0 to 3 and CW0 can be mapped to the rest of layers at the corresponding rank.

TABLE 6

|         | Rank 5 | Rank 6 | Rank 7 | Rank 8 |
|---------|--------|--------|--------|--------|
| Layer 0 | CW0    | CW0    | CW0    | CW0    |
| Layer 1 | CW0    | CW0    | CW0    | CW0    |

TABLE 6-continued

|         | Rank 5 | Rank 6 | Rank 7 | Rank 8 |
|---------|--------|--------|--------|--------|
| Layer 2 | CW0    | CW0    | CW0    | CW0    |
| Layer 3 | CW0    | CW0    | CW0    | CW0    |
| Layer 4 | CW1    | CW1    | CW1    | CW1    |
| Layer 5 |        | CW1    | CW1    | CW1    |
| Layer 6 |        |        | CW1    | CW1    |
| Layer 7 |        |        |        | CW1    |

After codeword-layer mapping has been performed like Table 6, if a single codeword, i.e., CW0, is transmitted only, since VW0 is transmitted by being divided onto Layers 0 to 3 in a $2^{nd}$ slot of an R-PDCCH transmitted subframe, all available resources can be utilized and an early decoding is possible as well.

$3^{rd}$ Embodiment

The above-proposed methods propose that 4 layers are basically used only for a transmission at Rank 5 or higher. In particular, although a channel can accommodate more space multiplexing, maximum Rank 4 transmission is supported only in an R-PDCCH transmitted subframe in order to early decode R-PDCCH, i.e., a DL grant. This scheme can perform an early decoding but may be inefficient in aspect of wasting resources.

FIG. 16 is a diagram to describe an existing DM-RS antenna port mapping scheme.

As mentioned in the foregoing description, for an early decoding of R-PDCCH (i.e., DL grant), the number of layers, which use a DMRS group having an R-PDCCH mapped layer belong thereto, should be equal to or smaller than 2. In particular, despreading by a spreading factor 2 should be possible.

Hence, when R-PDCCH is transmitted on a layer 0 (antenna port 7), an early decoding is available for a transmission using 4 layers only. In case that R-PDCCH is mapped to a layer 2, a transmission using 5 layers is possible.

Yet, according to a current DM-RS antenna port mapping scheme, since the number of layers belonging to each of two DM-RS groups is at least 3 in a transmission at Rank 6 or higher, an early decoding is impossible. Moreover; if R-PDCCH is mapped to a layer belonging to DM-RS Group 1 at Rank 5, an early decoding is impossible.

Therefore, according to a $3^{rd}$ embodiment of the present invention, proposed is a method available for ranks up to Rank 6 with additional possibility of an early decoding. In particular, provided is a method of mapping at most 2 layers to DM-RS group including an R-PDCCH belonging layer up to Rank-6 transmission by changing an existing DM-RS antenna port mapping method.

Therefore, in order to enable an early decoding by multiplexing 6 layers, the existing DM-RS antenna port mapping scheme shown in FIG. 16 is modified to propose a DM-RS antenna port mapping shown in FIG. 17 or FIG. 18.

FIG. 17 is a diagram for one example of a DM-RS antenna port mapping scheme according to a $3^{rd}$ embodiment of the present invention. Particularly, in FIG. 17, it is assumed that R-PDCCH is mapped to Layer 0 or Layer 1.

FIG. 18 is a diagram for another example of a DM-RS antenna port mapping scheme according to a $3^{rd}$ embodiment of the present invention. Yet, in FIG. 18, it is assumed that R-PDCCH is mapped to Layer 2 or Layer 3.

In case of using the DM-RS antenna port mapping shown in FIG. 17 or FIG. 18, since two layers are multiplexed up to Ran 6 transmission in a DM-RS group to which an R-PDCCH mapped layer belongs, a spreading factor can be maintained as 2 and an R-PDCCH early decoding is possible.

4th Embodiment

The R-PDCCH early decoding in Rank 6 transmission, which can be implemented by the DM-RS antenna port mapping scheme proposed by the 3rd embodiment of the present invention, can be implemented through a codeword-layer mapping. In particular, according to a 4th embodiment of the present invention, in order to enable an early decoding while 6 layers are multiplexed, a codeword-layer mapping scheme is proposed to be modified. In particular, according to a 4th embodiment of the present invention, assume that the existing DM-RS antenna port mapping scheme shown in FIG. 17 is applied.

Table 7 in the following shows a codeword-layer mapping. Yet, assume that a rank is equal to the number of layer(s).

TABLE 7

|  | CW0 | CW1 |
| --- | --- | --- |
| Rank 1 | Layer 0 | — |
| Rank 2 | Layer 0 | Layer 1 |
| Rank 3 | Layer 0 | Layer 1, 2 |
| Rank 4 | Layer 0, 1 | Layer 2, 3 |
| Rank 5 | Layer 0, 1 | Layer 2, 3, 4 |
| Rank 6 | Layer 0, 1, 2 | Layer 3, 4, 5 |
| Rank 7 | Layer 0, 1, 2 | Layer 3, 4, 5, 6 |
| Rank 8 | Layer 0, 1, 2, 3 | Layer 4, 5, 6, 7 |

It is apparent that dispreading by a spreading factor 4 is performed in a transmission at Rank 5 or higher. According to the present invention, a codeword including an R-PDCCH mapped layer (e.g., Layer 0, Layer 1) is proposed to be mapped to the rest of layers except Layer 4 or Layer 6 in order to perform a dispreading by a spreading factor 2 in Rank 6 transmission. Yet, in case that R-PDCCH is mapped to Layer 2 or Layer 3, a corresponding codeword can be mapped to the rest of layers except Layer 5 or Layer 7.

The present invention assumes that an index of a layer, to which a single codeword is mapped, may be discontinuous in performing a codeword-layer mapping. Table 8 in the following shows a codeword-layer mapping scheme according to a 4 ht embodiment of the present invention.

TABLE 8

|  | CW0 | CW1 |
| --- | --- | --- |
| Rank 1 | Layer 0 | — |
| Rank 2 | Layer 0 | Layer 1 |
| Rank 3 | Layer 0 | Layer 1, 2 |
| Rank 4 | Layer 0, 1 | Layer 2, 3 |
| Rank 5 | Layer 0, 1 | Layer 2, 3, 5 |
| Rank 6 | Layer 0, 1 | Layer 2, 3, 5, 7 |
| Rank 7 | Layer 0, 1, 4 | Layer 2, 3, 5, 7 |
| Rank 8 | Layer 0, 1, 4, 6 | Layer 2, 3, 5, 7 |

In Table 8, a codeword-layer mapping at Rank 6 can be performed by a mapping method shown in Table 9 in order to equally arrange an inter-CW layer number.

TABLE 9

| Rank 6 | Layers 0, 1, 5 | Layers 2, 3, 7 |
| --- | --- | --- |

According to a 4th embodiment of the present invention, without changing an existing DM-RS antenna port mapping scheme, a corresponding codeword in a transmission at Rank 6 or lower can despread by a spreading factor 2 and can perform an R-PDCCH early decoding.

According to the above-mentioned embodiments, R-PDCCH is described, by which the present invention may be non-limited. And, it is apparent that the present invention is applicable to a case (e.g., E-PDCCH (enhanced-PDCCH)) of inserting PDCCH in an existing PDSCH region. Therefore, a receiving end can include all entities capable of receiving a data channel (i.e., PDSCH) from such a transmitting end as a UE and the like as well as from an RN.

Figure 19:
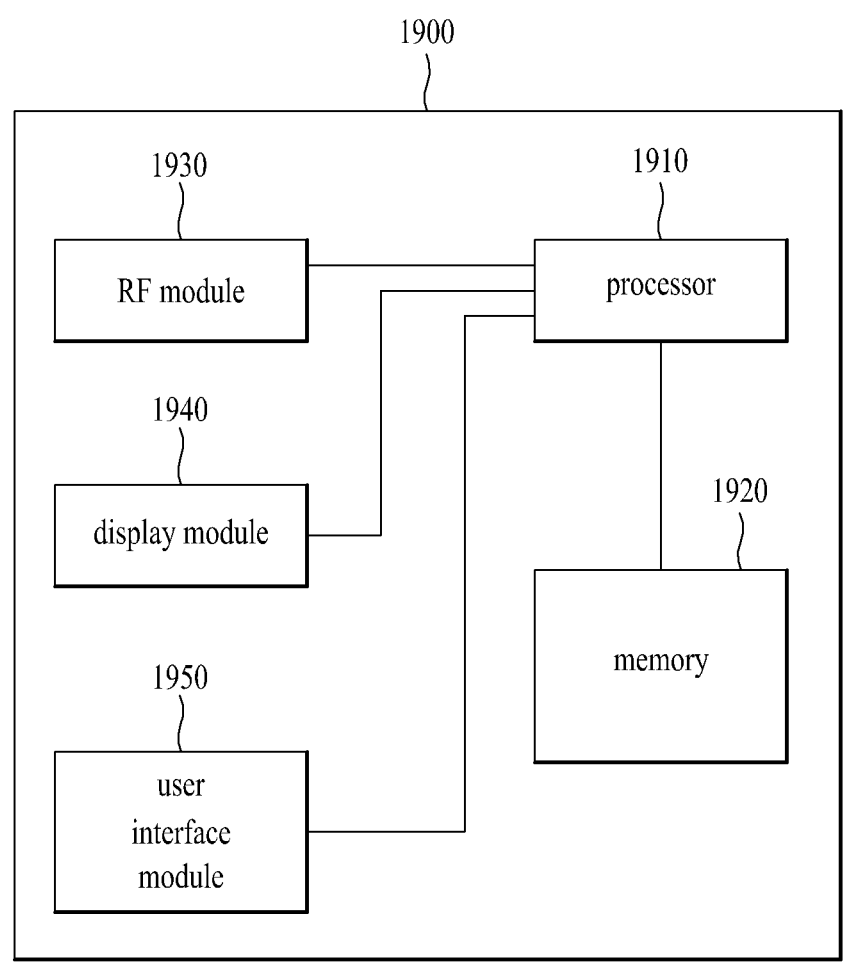
FIG. 19 is a block diagram for one example of a communication device according to one embodiment of the present invention.

FIG. 19 is a block diagram for one example of a communication device according to one embodiment of the present invention.

Referring to FIG. 19, a communication device 1900 includes a processor 1910, a memory 1920, an RF module 1930, a display module 1940 and a user interface module 1950.

The communication device 1900 is illustrated for clarity and convenience of the description and some modules can be omitted. Moreover, the communication device 1900 may further include at least one necessary module. And, some modules of the communication device 1900 can be further divided into sub-modules. The processor 1910 is configured to perform operations according to the embodiment of the present invention exemplarily described with reference to the accompanying drawings. In particular, the detailed operations of the processor 1910 can refer to the contents described with reference to FIGS. 1 to 18.

The memory 1920 is connected to the processor 1910 and stores an operating system, applications, program codes, data and the like. The RF module 1930 is connected to the processor 1910 and performs a function of converting a baseband signal to a radio signal or converting a radio signal to a baseband signal. For this, the RF module 1930 performs analog conversion, amplification, filtering and frequency uplink transform or inverse processes thereof. The display module 1940 is connected to the processor 1910 and displays various kinds of informations. The display module 1940 can include such a well-known element as LCD (Liquid Crystal Display), LED (Light Emitting Diode), OLED (Organic Light Emitting Diode) and the like, by which the present invention is non-limited. The user interface module 1950 is connected to the processor 1910 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that those claims can be included as new claims by revision after filing an application.

In the present disclosure, embodiments of the present invention are described centering on the data transmission/reception relations between a relay node and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method for transceiving a signal between a base station and a relay node in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of transmitting a downlink signal to a receiving end by a transmitting end in a wireless communication system, the method comprising:
   mapping a relay node specific physical downlink control channel (R-PDCCH) to a 1st slot of a specific resource block pair among a plurality of resource block pairs for a downlink data channel;
   mapping the downlink data channel to a $2^{nd}$ slot of the specific resource block pair and another resource block pair of the plurality of resource block pairs;
   transmitting the R-PDCCH through the 1st slot of the specific resource block pair;
   transmitting the downlink data channel through the 2nd slot of the specific resource block pair and the another resource block pair; and
   transmitting N demodulation resource signals (DM-RSs) through the another resource block pair and up to 4 DM-RSs among the N DM-RSs through the specific resource block pair,
   wherein N is larger than 4,
   wherein each of the up to 4 DM-RSs is spread into each of the 1st and 2nd slots of the specific resource block pair by an orthogonal cover code of which a spreading factor is 2, and
   wherein each of the N DM-RSs is spread across 1st and 2nd slots of the another resource block pair by an orthogonal cover code of which a spreading factor is 4.

2. The method of claim 1, wherein the downlink data channel carries maximum 2 codewords, and the downlink data channel mapped to the $2^{nd}$ slot of the specific resource block pair carries 1 codeword only.

3. The method of claim 1, wherein a number of spatial resources for the R-PDCCH is limited to be equal to or smaller than a specific number.

4. The method of claim 1, wherein the R-PDCCH includes grant information for receiving the downlink data channel.

5. The method of claim 1, wherein a time region of the resource block pair is divided into the $1^{st}$ slot and the $2^{nd}$ slot.

6. The method of claim 1, wherein a number of antenna ports for the up to 4 DM-RSs is limited to be equal to or smaller than 4, and a maximum number of antenna ports for the N DM-RSs is 8.

7. A transmitting apparatus in a wireless communication system, the transmitting apparatus comprising:
   a processor; and
   a radio frequency (RF) module operatively coupled to the processor,
   the processor configured to:
      map a relay node specific physical downlink control channel (R-PDCCH) to a 1st slot of a specific resource block pair among a plurality of resource block pairs for a downlink data channel, and
      map the downlink data channel to a $2^{nd}$ slot of the specific resource block pair and to another resource block pair of the plurality of resource block pairs,
   the RF module configured to:
      transmit the R-PDCCH through the 1st slot of the specific resource block pair to a receiving end,
      transmit the downlink data channel through the 2nd slot of the specific resource block pair and the another resource block pair to the receiving end, and
      transmit N demodulation resource signals (DM-RSs) through the another resource block pair and up to 4 DM-RSs among the N DM-RSs through the specific resource block pair to the receiving end,
   wherein N is larger than 4,
   wherein each of the up to 4 DM-RSs is spread into each of the 1st and 2nd slots of the specific resource block pair by an orthogonal cover code of which spreading factor is 2, and
   wherein each of the N DM-RSs is spread across 1st and 2nd slots of the another resource block pair by an orthogonal cover code of which spreading factor is 4.

8. The transmitting apparatus of claim 7, wherein the downlink data channel carries maximum 2 codewords, and the processor controls 1 codeword to be carried on the downlink data channel mapped to the $2^{nd}$ slot of the specific resource block pair only.

9. The transmitting apparatus of claim 7, wherein a number of spatial resources for the R-PDCCH is limited to be equal to or smaller than a predetermined number.

10. The transmitting apparatus of claim 7, wherein the R-PDCCH includes grant information for receiving the downlink data channel.

11. The transmitting apparatus of claim 7, wherein a time region of the resource block pair is divided into the $1^{st}$ slot and the $2^{nd}$ slot.

12. The transmitting apparatus of claim 7, wherein the processor limits a number of antenna ports for the up to 4 DM-RSs to be equal to or smaller than 4, and a maximum number of antenna ports for the N DM-RSs is 8.

13. A method of receiving a downlink signal from a transmitting end in a wireless communication system, the method comprising:
 receiving a relay node specific physical downlink control channel (R-PDCCH) through a 1st slot of the specific resource block pair;
 receiving the downlink data channel through the 2nd slot of the specific resource block pair and another resource block pair;
 receiving N demodulation resource signals (DM-RSs) through the another resource block pair and up to 4 DM-RSs among the N DM-RSs through the specific resource block pair;
 demodulating the R-PDCCH by using only the up to 4 DM-RSs which spread into the 1st slot of the specific resource block pair; and
 demodulating the downlink data channel by using the N DM-RSs which spread into the 1st slot and the 2nd slot of the another resource block pair,
 wherein N is larger than 4,
 wherein each of the up to 4 DM-RSs is spread into each of the 1st and 2nd slots of the specific resource block pair by an orthogonal cover code of which a spreading factor is 2, and
 wherein each of the N DM-RSs is spread across 1st and 2nd slots of the another resource block pair by an orthogonal cover code of which a spreading factor is 4.

14. The method according to claim 13, wherein the downlink data channel carries maximum 2 codewords, and the processor controls 1 codeword to be carried on the downlink data channel mapped to the 2nd slot of the specific resource block pair only.

15. The method according to claim 13, wherein a number of spatial resources for the R-PDCCH is limited to be equal to or smaller than a predetermined number.

16. The method according to claim 13, wherein the R-PDCCH includes grant information for receiving the downlink data channel.

17. A receiving apparatus in a wireless communication system, the receiving apparatus comprising:
 a processor; and
 a radio frequency (RF) module,
 the RF module configured to:
  receive a relay node specific physical downlink control channel (R-PDCCH) through a 1st slot of the specific resource block pair,
  receive the downlink data channel through the 2nd slot of the specific resource block pair and another resource block pair, and
  receive N demodulation resource signals (DM-RSs) through the another resource block pair and up to 4 DM-RSs among the N DM-RSs through the specific resource block pair,
 the processor configured to:
  demodulate the R-PDCCH by using only the up to 4 DM-RSs which spread into the 1st slot of the specific resource block pair, and
  demodulate the downlink data channel by using the N DM-RSs which spread into the 1st slot and the 2nd slot of the another resource block pair,
 wherein N is larger than 4,
 wherein each of the up to 4 DM-RSs is spread into each of the 1st and 2nd slots of the specific resource block pair by an orthogonal cover code of which a spreading factor is 2, and
 wherein each of the N DM-RSs is spread across 1st and 2nd slots of the another resource block pair by an orthogonal cover code of which a spreading factor is 4.

18. The receiving apparatus according to claim 17, wherein the downlink data channel carries maximum 2 codewords, and the processor controls 1 codeword to be carried on the downlink data channel mapped to the 2nd slot of the specific resource block pair only.

19. The receiving apparatus according to claim 17, wherein a number of spatial resources for the R-PDCCH is limited to be equal to or smaller than a predetermined number.

20. The receiving apparatus according to claim 17, wherein the R-PDCCH includes grant information for receiving the downlink data channel.

* * * * *